United States Patent [19]

Bowen

[11] Patent Number: 4,498,167
[45] Date of Patent: Feb. 5, 1985

[54] TDM COMMUNICATION SYSTEM

[75] Inventor: James H. Bowen, Williamsburg, Va.

[73] Assignee: International Telephone and Telegraph Corporation, New York, N.Y.

[21] Appl. No.: 353,695

[22] Filed: Mar. 1, 1982

[51] Int. Cl.$^3$ ............................................. H04Q 11/04
[52] U.S. Cl. ...................................................... 370/44
[58] Field of Search ............................. 370/44, 41, 86

[56] References Cited

U.S. PATENT DOCUMENTS

| 3,633,166 | 1/1972 | Picard | 370/86 |
| 3,720,791 | 3/1973 | Yada et al. | 370/44 |
| 3,723,657 | 3/1973 | Muller | 370/44 |
| 3,761,621 | 9/1973 | Vollmeyer et al. | 370/44 |
| 4,358,845 | 11/1982 | de Passoz | 370/44 |

Primary Examiner—Douglas W. Olms
Assistant Examiner—Wellington Chin
Attorney, Agent, or Firm—John T. O'Halloran; Robert P. Seitter

[57] ABSTRACT

A time division multiplex digital data communication system with reduced band width. The system operates on independent digital signals so they can be multiplexed by encoding the time of transition of the digital data on each channel and transmitting serially the encoded times along with a bit for indicating the direction of transition or state after the transition plus bits for synchronization and/or overhead, as necessary.

22 Claims, 3 Drawing Figures

TDM COMMUNICATION SYSTEM

BACKGROUND OF THE INVENTION

The present invention relates to communication systems and more particularly to a time division multiplex (TDM) communication system.

In the past, the technique for multiplexing independent digital signal sources has used oversampling. This method is simple, but very wasteful of bandwidth. For instance, if M channels of maximum bit rate, B, are to be transmitted with a maximum edge distortion of less than, say, 2%, then the output bit rate must be at least $M \times B \times 50$.

SUMMARY OF THE INVENTION

An object of the present invention is to provide a TDM communication system employing a multiplexing and demultiplexing technique which will reduce the bandwidth necessary for transmission.

In the technique of the present invention, a time word of 6 bits resolution is required for an edge distortion of less than 2%. Allowing a bit in each word for synchronization and a bit for the data level, the new multiplexing and demultiplexing arrangement requires 8 bits per channel per frame. The data rate output of the new multiplexer is then $M \times B \times 8$, a savings of more than 6 times in bit rate when compared to the above bit rate of the prior art arrangement.

The technique of the present invention is also much simpler than previous techniques for multiplexing non-independent digital signals with high bandwidth efficiency, since the previous bandwidth-efficient techniques required circuitry to regenerate the data channel clock in each data channel unit.

The communication system of the present invention can be used for any and all 2-level digital signals whose maximum transition rate does not exceed the multiplexer frame rate. (The minimum time between transitions must not be less than the frame period.) Additional data level bits can be incorporated to allow extension to greater than 2-level digital signals. The maximum edge jitter of the output data can be made as small as desired by adding additional bits in the time word. Discrete, synchronous, asynchronous and mixed-rate or variable-rate signals can all be transmitted employing the technique of the present application.

A feature of the present invention is the provision of a time division multiplex communication system comprising: a multiplexer to multiplex each of M digital data sources into a multiplex frame including a serial pattern of M data words each made up of n serial bits of which at least one bit is a synchronization bit, at least one other bit indicates the direction of the data transition or data level, and the remaining $n-2$ bits represent one of $N = 2^{(n-2)}$ code words which indicates the time of transition of the digital data source relative to the time of the beginning of the multiplex frame, where M is an integer greater than one and n is an integer greater than two, the multiplexer including first means to generate in time sequence N different code words each defining a different one of the N time slots, and M second means each coupled to a different one of the M sources and to the first means to detect a data transition in the data of an associated one of the M sources, to provide an associated one of the N code words in response to detection of the data transition, to provide at least one bit indicating the direction of the transition and to provide at least one additional bit for a synchronization bit, each of the M second means being coupled in cascade with respect to each other to provide a serial time multiplexed output for the multiplexer including the associated one of the N code words, the one bit and the one additional bit from each of the M second means; and a demultiplexer coupled to the multiplexer to demultiplex the M digital data from the multiplexed output including third means to generate in time sequence the N code words in response to the multiplexed output, M fourth means each coupled to the third means and in cascade with respect to each other and the multiplexed output to extract the M digital data from the multiplexed output, and fifth means coupled to each of the M fourth means and to the third means to detect a synchronization pattern provided by each of the one additonal bit to synchronize the third means to the first means.

Another feature of the present invention is the provision of a multiplexer to multiplex each of the M digital data sources into a multiplex frame including a serial pattern of M data words each made up of n serial bits of which at least one bit is a synchronization bit, at least one other bit indicates the direction of the data transition or data level, and the remaining $n-2$ bits represent one of $N = 2^{(n-2)}$ code words which indicates the time of transition of the digital data source relative to the time of the beginning of the multiplex frame, where M is an integer greater than one and n is an integer greater than two, comprising: first means to generate in time sequence N different code words each defining a different one of the N time slots; and M second means each coupled to a different one of the M sources and to the first means to detect a data transistion in the data of an associated one of the M sources, to provide an associated one of the N code words in response to detection of the data transition and to provide at least one bit indicating the direction of the transition, each of the M second means being coupled in cascade with respect to each other to provide a serial time multiplexed output for the multiplexer including the associated one of the N code words and the one bit from each of the M second means.

Still another feature of the present invention is the provision of a demultiplexer to demultiplex a time division multiplex signal including a serial pattern of M data words, where M is an integer greater than one, comprising: first means responsive to the multiplex signal to generate in time sequence N different code words each defining a different one of the N time slots; M second means each coupled to the third means and in cascade with respect to each other and the multiplex signal to extract the M data signals from the multiplex signal; and third means coupled to each of the M second means and to the first means to detect a synchronization pattern provided by one additional bit in each of the M data signals to synchronize the first means to the multiplex signal.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
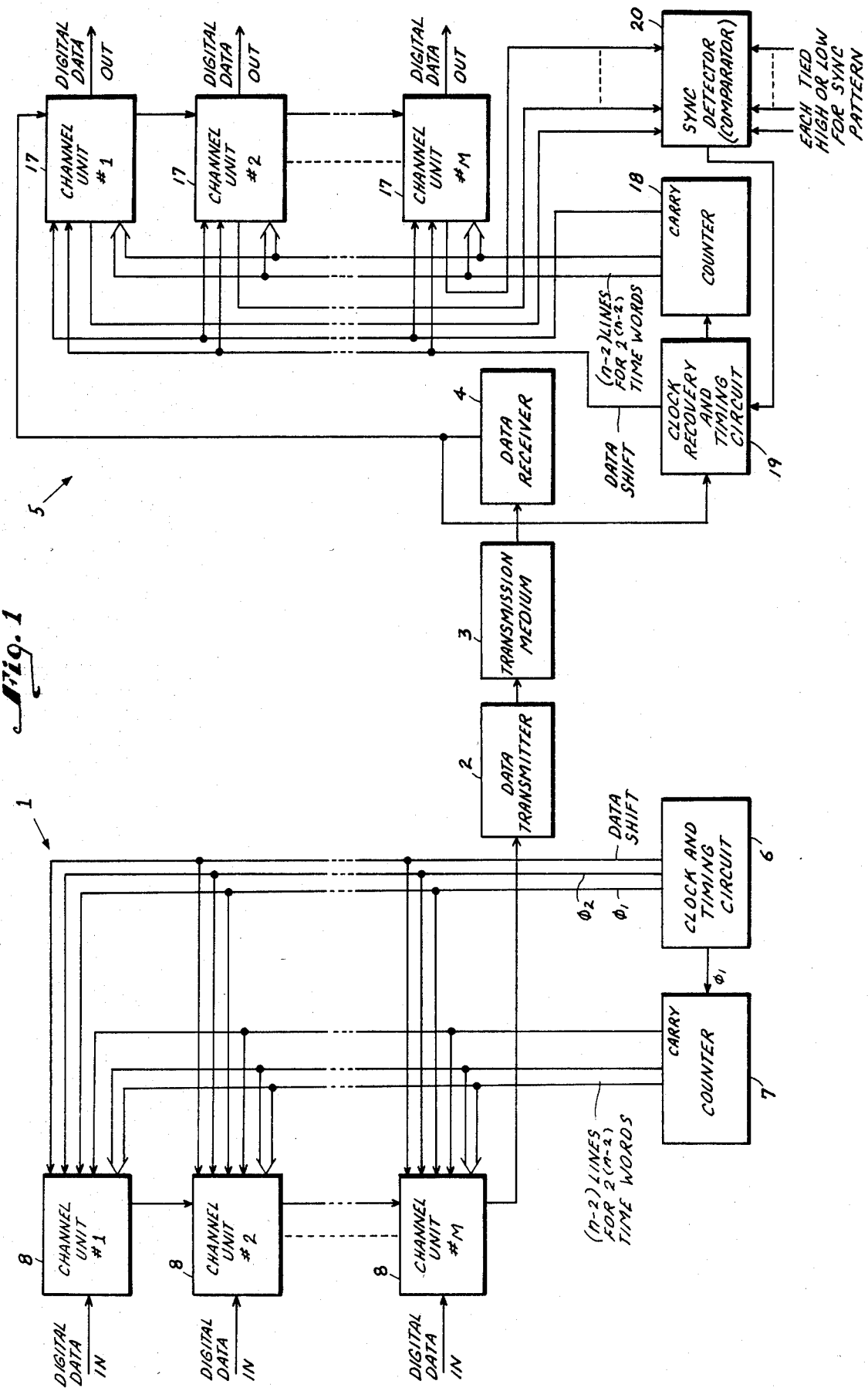
FIG. 1 is a block diagram of a time division multiplex digital data communication system in accordance with the principles of the present invention.

Referring to FIG. 1 there is illustrated in block diagram a TDM digital data communication system in accordance with the principles of the present invention incorporating a multiplexer 1 in the transmitting portion of the system coupled to a data transmitter 2 to transmit the resultant multiplexed signal in a predetermined frame format to a transmission medium 3 for transmission to a data receiver 4 and a demultiplexer 5 in the receiving portion of the communication system of the present invention.

The transmission medium 3 may be any desired type of medium such as, an optical fiber, a wire transmission medium, a line of sight radio transmission medium, a tropospheric scatter transmission medium or a satellite transmission medium.

Basically, the TDM digital data communication system of the present invention operates on independent digital signals so they can be mulitplexed by encoding the time of transition (if any) of the digital data on each channel, and transmitting serially the encoded times along with a bit for indicating the direction of transition or state after the transition, plus bits for synchronization and/or overhead, as necessary.

Multiplexer 1 includes as common equipment therein a clock and timing circuit 6 and a counter 7 coupled to channel units 8 with each of the channel units 8 being coupled to a different one of the digital data to be multiplexed into a multiplex frame. Each of the channel units 8 are connected in cascade with each other and the data transmitter 2.

The output of counter 7 is a digital word (n−2) bits wide which represents a time slot within a multiplex frame. For instance, if the time word is 6 bits wide, then the multiplex frame is divided into $2^6 = 64$ $(2^{(n-2)} = N)$ discrete time intervals, each represented by a unique time word from counter 7. The time word identifies the time from the start of a frame.

Figure 2:
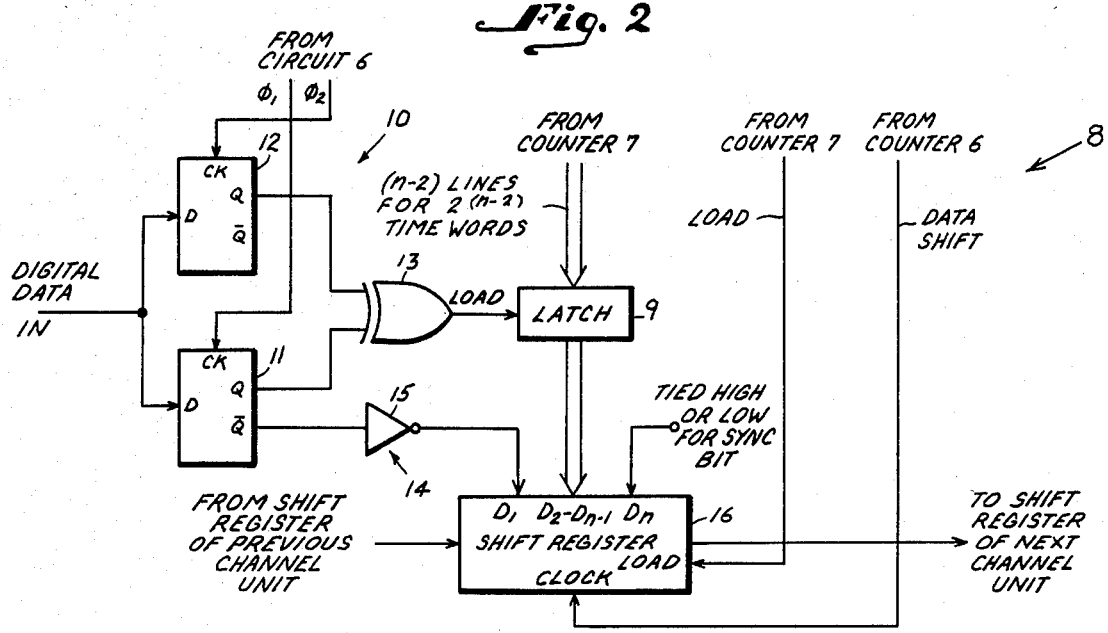
FIG. 2 is a block diagram of a channel unit in the transmitting portion of the communication system of FIG. 1.

As illustrated in FIG. 2, a time word from counter 7 is fed to a latch 9 in each channel unit with latch 9 being capable of being loaded with only a particular time word appropriately related to the time slot in the multiplex frame during which a transition (if any) took place in the digital data coupled to that channel unit. Latch 9 is loaded with its appropriate time word immediately following the detection of a transition in the incoming digital data. Thus, latch 9 stores the time in which a data transition occurs. Since bad data (incorrect time count) could be loaded into the latch if the latch were loaded when transitions were taking place in the time word, an edge detector 10 is provided which allows latch 9 to be loaded only when the time count is steady between transitions. Alternatively, edge detector 10 could be eliminated if the counter output were a code such that only one bit changed at a time, such as a gray code. Edge detector 10 shown works with a 2-phase clock $\phi_1$ and $\phi_2$ which is timed with respect to the counter clock so that an output pulse occurs only when the count is steady. Edge detector 10 as illustrated works as follows. If the incoming data changes state, the new state is first clocked into D type flip-flop 11 by $\phi_1$, then is clocked into flip-flop 12 by $\phi_2$ slightly later in time. During the time period when the Q outputs of flip-flops 11 and 12 are different, the EXCLUSIVE-OR gate 13 produces an output pulse which loads latch 9. Since the output of counter 7 is steady when $\phi_1$ occurs, bad data is never loaded into latch 9.

In order that the demultiplexer may know whether the data went high or low, a data level signal is required which changes state concurrently with the output of edge detector 10. This is achieved by a level detector 14 consisting of the Q output of flip-flop 11 or the $\overline{Q}$ output inverted in inverter 15 as shown to better equalize gate delays. The data level signal is coupled to one of the parallel data inputs of a shift register 16 along with the data word previously loaded into latch 9. An additional data input to shift register 16 can provide a sync bit and is tied high or low at each channel unit to form any desired overall sync pattern. Thus, each channel unit 8 provides one bit of the overall synchronization pattern.

At the end of each multiplex frame, immediately following the last possible latch load due to a positive transition during $\phi_1$, the data from the latch 9, the sync bit and level bit from detector 14 are loaded into shift register 16 by the carry pulse from counter 7. Shift register 16, along with the shift registers from the other channel units, perform the parallel-to-serial conversion to produce the output multiplexed data stream. Shift registers 16 of each of the channel units 8 are connected in cascade and their data is shifted out during the following frame under control of the data shift output from clock and timing circuit 6.

In demultiplexer 5 a complimentary operation is performed to that of multiplexer 1. As in the multiplexer 1 there is a counter 18 providing time sequentially the same code words as counter 7 each related to a different one of the time slots of the received time multiplexed signal. Counter 18 receives its clock input from a clock recovery and timing circuit 19 (FIG. 1) which is coupled to the output of data receiver 4 so that the clock for counter 18 can be recovered from the received data with the clock output to circuit 19 being synchronized by the control signal produced in sync detector 20, the operation of which will be described hereinbelow.

Figure 3:
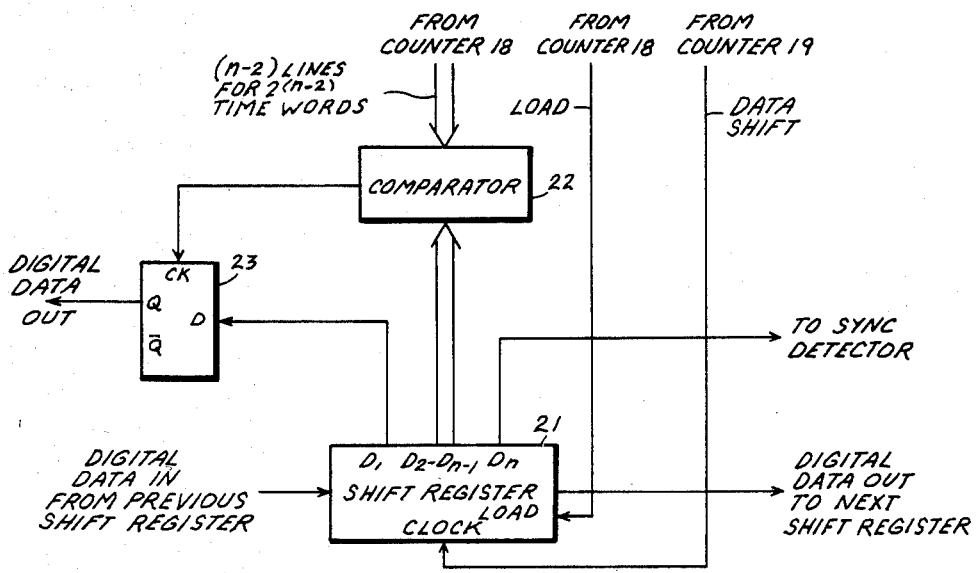
FIG. 3 is a block diagram of the channel unit of the receiving portion of the communication system of FIG. 1.

FIG. 3 shows the block diagram of each of the channel units 17. The incoming data stream or time multiplexed signal from data receiver 4 is clocked serially into the cascade connected shift register 21 of each of the channel units 17. When a complete frame is shifted into the shift registers 21, a load pulse from the carry output of counter 18 causes the data to be dumped to latched parallel outputs of shift registers 21. During the next frame, while new data is being shifted into the shift registers, comparator 22 compares the latched data output of the previous frame from shift register 21 to the time word outputs of counter 18. When the time word from counter 18 and the latched data in shift register 21 coincide, the output of comparator 22 goes high, causing the D-type flip-flop 23 to load the new data level to the output at the proper time with respect to the beginning of the multiplex frame.

Frame synchronization is achieved by feeding the sync bit output from shift register 21 to a sync detector 20 in the form of a comparator which also receives bits from all of the other channel units. The other inputs of the comparator or sync detector 20 are tied high or low to generate a local synchronization pattern. If the received synchronization pattern matches the locally produced synchronization pattern, the output of detector or comparator 20 causes the clock recovery and timing circuit 19 to maintain normal output. If the received synchronization pattern does not match the locally generated pattern, the output of detector 20 goes low causing the timing in circuit 19 to skip a pulse thereby shifting the frame one bit. This process continues on each frame until the proper synchronization pattern match is found.

While I have described above the principles of my invention in connection with specific apparatus, it is to be clearly understood that this description is made only by way of example and not as a limitation to the scope of my invention as set forth in the objects thereof and in the accompanying claims.

I claim:

1. A time division multiplex communication system comprising:
   a multiplexer to multiplex each of M digital data sources into a multiplex frame including a serial pattern of M data words each made up of n serial bits of which at least one bit is a synchronization bit, at least one other bit indicates the direction of the data transition or data level, and the remaining n−2 bits represent one of $N = {}^{(n-2)}$ code words which indicates the time of transition of the digital data source relative to the time of the beginning of the multiplex frame, where M is an integer greater than one and n is an integer greater than two, said multiplexer including
   first means to generate in time sequence N different code words each defining a different one of said N time slots, said first means including a first clock and timing circuit to provide first and second time shifted clock signals and a first counter coupled to said first circuit to provide said N code words, and
   M second means each coupled to a different one of said M sources and to said first means to detect a data transition in said data of an associated one of said M sources, to provide an associated one of said N code words in response to detection of said data transition, to provide at least one bit indicating the direction of said transition and to provide at least one additional bit for a synchronization bit, each of said M second means being coupled in cascade with respect to each other to provide a serial time multiplexed output for said multiplexer including said associated one of said N code words, said one bit and said one additional bit from each of said M second means; and
   a demultiplexer coupled to said multiplexer to demultiplex said M digital data from said multiplexed output including
   third means to generate in time sequence said N code words in response to said multiplexed output,
   M fourth means each coupled to said third means and in cascade with respect to each other and said multiplexed output to extract said M digital data from said multiplexed output, and
   fifth means coupled to each of said M fourth means and to said third means to detect a synchronization pattern provided by each of said one additional bit to synchronize said third means to said first means.

2. A system according to claim 1, wherein each of said M second means includes
   an edge detector coupled to an associated one of said M sources and said first circuit responsive to said first and second clock signals to detect said data transition,
   a level detector coupled to said edge detector to provide said one bit,
   a latch coupled to said edge detector and said first counter to load said associated one of said N code words therein in response to an output from said edge detector, and
   a first shift register coupled to said level detector, said latch, said first circuit and in cascade with first shift registers of preceding and following ones of said M second means to cooperate in providing said multiplexed output.

3. A system according to claim 2, wherein said first shift register includes an additional input connected to a selected one of a binary "1" and a binary "0" to provide said one additional bit to be compatible with said synchronization pattern.

4. A system according to claims 2 or 3, wherein said edge detector includes a pair of D-type flip-flops each coupled to said associated one of said M sources and a different one of said first and second clock signals and an EXCLUSIVE-OR gate coupled to the Q output of each of said pair of flip-flops and to a load input of said latch.

5. A system according to claim 4, wherein said level detector includes an inverter coupled to a $\overline{Q}$ output of a given one of said pair of flip-flops.

6. A system according to claim 5, wherein said third means includes
   a clock recovery circuit to receive said multiplexed output to extract a clock signal therefrom,
   a second timing circuit coupled to said clock recovery circuit and said fifth means to provide a timing signal, and
   a second counter coupled to said second circuit to provide said N code words.

7. A system according to claim 6, wherein each of said M fourth means includes
   a second shift register coupled to said second counter, said second circuit and second shift registers of preceding and following ones of said M fourth means,
   a first comparator coupled to said second shift register and said second counter to compare said N code words with the contents of said second shift register, and
   a D-type flip-flop coupled to said first comparator and said second shift register to extract an associated one of said M digital data from said mulitplexed output when said first comparator detects coincidence between its two inputs.

8. A system according to claim 7, wherein said fifth means includes
   a second comparator having said synchronization pattern coupled thereto and coupled to each of said second shift registers responsive to each of said one additional bits to provide a control signal for coupling to said second circuit to synchronize said second counter to said first counter.

9. A system according to claim 6, wherein said fifth means includes
   a comparator having said synchronization pattern coupled thereto and coupled to each of said M fourth means responsive to each of said one additional bits to provide a control signal to synchronize said second counter to said first counter.

10. A multiplexer to multiplex each of M digital data sources into a multiplex frame including a serial pattern of M data words each made up of n serial bits of which at least one bit is a synchronization bit, at least one other bit indicates the direction of the data transition or data level, and the remaining n−2 bits represent one of $N=2^{(n-2)}$ code words which indicates the time of transition of the digital data source relative to the time of the beginning of the multiplex frame, where M is an integer greater than one and n is an integer greater than two, comprising:

first means to generate in time sequence N different code words each defining a different one of said N time slots, said first means including a clock and timing circuit to provide first and second time shifted clock signals and a counter coupled to said circuit to provide said N code words; and M second means each coupled to a different one of said M sources and to said first means to detect a data transition in said data of an associated one of said M sources, to provide an associated one of said N code words in response to detection of said data transition and to provide at least one bit indicating the direction of said transition, each of said M second means being coupled in cascade with respect to each other to provide a serial time multiplexed output for said multiplexer including said associated one of said N code words and said one bit from each of said M second means.

11. A multiplexer according to claim 10, wherein each of said M second means further provides at least one additional bit for a selected one of a synchronization bit of a multibit synchronization pattern.

12. A multiplexer according to claim 11, wherein each of said M second means includes an edge detector coupled to an associated one of said M sources and said circuit responsive to said first and second clock signals to detect said data transition, a level detector coupled to said edge detector to provide said one bit, a latch coupled to said edge detector and said counter to load said associated one of said N code words therein in response to an output from said edge detector, and a shift register coupled to said level detector, said latch, said circuit and in cascade with shift registers of preceding and following ones of said M second means to cooperate in providing said multiplexed output.

13. A multiplexer according to claim 12, wherein said shift register includes an additional input connected to a selected one of a binary "1" and a binary "0" to provide a synchronization bit as said one additional bit.

14. A multiplexer according to claims 12 or 13, wherein said edge detector includes a pair of D-type flip-flops each coupled to said associated one of said M sources and a different one of said first and second clock signals and an EXCLUSIVE-OR gate coupled to the Q output of each of said pair of flip-flops and to a load input of said latch.

15. A multiplexer according to claim 14, wherein said level detector includes an inverter coupled to a $\overline{Q}$ output of a given one of said pair of flip-flops.

16. A multiplexer according to claim 10, wherein said first means includes a clock and timing circuit to provide first and second time shifted clock signals, and a counter coupled to said circuit to provide said N code words.

17. A multiplexer according to claim 16, wherein each of said M second means includes an edge detector coupled to an associated one of said M sources and said circuit responsive to said first and second clock signals to detect said data transition, a level detector coupled to said edge detector to provide said one bit, a latch coupled to said edge detector and said counter to load said associated one of said N code words therein in response to an output from said edge detector, and a shift register coupled to said level detector, said latch, said circuit and in cascade with shift registers of preceding and following ones of said M second means to cooperate in providing said multiplexed output.

18. A multiplexer according to claim 17, wherein said shift register includes an additional input connected to a selected one of a binary "1" and a binary "0" to provide a given bit for a multibit synchronization pattern.

19. A multiplexer according to claims 17 or 18, wherein said edge detector includes a pair of D-type flip-flops each coupled to said associated one of said N sources and a different one of said first and second clock signals and an EXCLUSIVE-OR gate coupled to the Q output of each of said pair of flip-flops and to a load input of said latch.

20. A multiplexer according to claim 19, wherein said level detector includes an inverter coupled to a $\overline{Q}$ output of a given one of said pair of flip-flops.

21. A multiplexer according to claim 10, wherein each of said N second means includes an edge detector coupled to an associated one of said M sources and said first means to detect said data transition, a level detector coupled to said edge detector to provide said one bit, a latch coupled to said edge detector and said first means to load said associated one of said N code words therein in response to an output from said edge detector, and a shift register coupled to said level detector, said latch, said first means and in cascade with shift registers of preceding and following ones of said M second means to cooperate in providing said multiplexed output.

22. A multiplexer according to claim 21, wherein said shift register includes an additional input connected to a selected one of a binary "1" and a binary "0" to provide a synchronization bit as said one additional bit.

* * * * *